(12) United States Patent
Cosyns et al.

(10) Patent No.: US 8,629,207 B2
(45) Date of Patent: Jan. 14, 2014

(54) AQUEOUS COATING FORMULATION

(75) Inventors: Audrey Cosyns, Mannheim (DE); Arno Tuchbreiter, Charlotte, NC (US); Robert Feuerhake, Mannheim (DE); Jörg Nieberle, Trostberg (DE)

(73) Assignee: BASF SE, Ludwigshafen (DE)

( * ) Notice: Subject to any disclaimer, the term of this patent is extended or adjusted under 35 U.S.C. 154(b) by 57 days.

(21) Appl. No.: 12/968,902

(22) Filed: Dec. 15, 2010

(65) Prior Publication Data

US 2011/0229716 A1    Sep. 22, 2011

Related U.S. Application Data

(60) Provisional application No. 61/287,216, filed on Dec. 17, 2009.

(51) Int. Cl.
*D21H 17/07* (2006.01)
*B05D 3/00* (2006.01)
*B05D 7/06* (2006.01)
*C08G 69/02* (2006.01)

(52) U.S. Cl.
USPC ............ 524/284; 106/287.25; 427/385.5; 528/288

(58) Field of Classification Search
USPC .................. 524/284; 427/385.5; 428/341
See application file for complete search history.

(56) References Cited

U.S. PATENT DOCUMENTS

| | | | |
|---|---|---|---|
| 3,313,736 A | | 4/1967 | Dickson et al. |
| 4,075,394 A | * | 2/1978 | Meyer .................. 428/537.1 |
| 4,104,228 A | * | 8/1978 | Meyer et al. .............. 524/608 |
| 5,051,283 A | | 9/1991 | Beane et al. |
| 5,233,020 A | | 8/1993 | Hase et al. |
| 6,075,079 A | * | 6/2000 | Helmer et al. .............. 524/253 |
| 2002/0028910 A1 | * | 3/2002 | Fry et al. .................. 528/288 |
| 2010/0280203 A1 | | 11/2010 | Feuerhake et al. |

FOREIGN PATENT DOCUMENTS

| | | |
|---|---|---|
| DE | 37 27 704 A1 | 3/1989 |
| DE | 40 03 422 A1 | 8/1991 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 01 437 A1 | 7/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| DE | 199 08 719 A1 | 9/2000 |
| EP | 0 771 328 B1 | 10/1998 |
| WO | WO 90/08175 A1 | 7/1990 |
| WO | WO 2009/080613 A1 | 7/2009 |

OTHER PUBLICATIONS

Nippon Shokubai, Polyethyleneimine:EPOMIN, http://www.shokubai.co.jp/en/products/functionality/epomin1.html.*
Polyethyleneimine: Epomin Product Brochure—Nippon Shokubai—http://www.shokubai.co.jp/en/products/functionality/epomin1.html.*
Polyethyleneimine: Epomin Product Brochure—Nippon Shokubai—http://www.shokubai.co.jp/en/products/functionality/epomin I .html.*
John M. Friel, "Acrylic Polymers as Coating Binders", Paint and coating Testing Manual: Fourteenth Edition, Ed. J.V. Koleske, ASTM Manual Series, Ann Arbor, MI, 1995, p. 41.*
International Preliminary Report on Patentability and Written Opinion issued Jun. 19, 2012 in PCT/EP2010/069557 filed Dec. 14, 2010.
First Office Action in Corresponding Chinese Patent Application No. 2010800577184, issued Apr. 22, 2013, 6 pp.

* cited by examiner

*Primary Examiner* — Ling Choi
*Assistant Examiner* — Ronald Grinsted
(74) *Attorney, Agent, or Firm* — Oblon, Spivak, McClelland, Maier & Neustadt, L.L.P.

(57) ABSTRACT

An aqueous coating formulation for tannin-containing substrates can include a substituted $C_2$-$C_4$ polyalkyleneimine. Reacting a $C_2$-$C_4$ polyalkyleneimine having a weight-average molecular weight of from 500 to 10,000 g/mol with a carboxylic acid derivative can produce the substituted polyalkyleneimine. The carboxylic acid derivative includes at least one $C_1$ to $C_{30}$ alkyl group or $C_3$ to $C_{30}$ alkenyl group. Substrates that contain tannin and are coated with this aqueous coating formulation exhibit outstanding resistance with respect to color runs and color strikethrough.

18 Claims, No Drawings

AQUEOUS COATING FORMULATION

The present invention provides an aqueous coating formulation comprising a substituted $C_2$-$C_4$ polyalkyleneimine which is obtainable by reacting a $C_2$-$C_4$ polyalkyleneimine having a weight-average molecular weight ≥500 and ≤10 000 g/mol with a carboxylic acid derivative of the general formula (I)

$$R\text{—}(C\text{=}O)X \qquad (I),$$

in which
R is a $C_1$ to $C_{30}$ alkyl group or a $C_3$ to $C_{30}$ alkenyl group and
X is a halogen, a hydroxyl group or a group R—(C=O)—O—,
where R has the definition indicated above,
with formation and removal of the byproduct HX.

Likewise provided by the present invention is the use of the aqueous coating formulation for coating tannin-containing substrates, a method of coating substrates, and the substrates coated by said method.

Tannins are water-soluble phenolic or polyphenolic compounds which occur naturally in woods and often have an inherent yellow to brown color. Tannins dissolved by water may migrate to the surface of the wood. Particularly after heavy rainfall, therefore, pale wood coatings suddenly develop brown runs and yellow knots, which have an adverse effect on the esthetic appearance of the coated woods. The phenomenon of color strikethrough may occur not only under wet conditions, such as rainfall, but also during the actual application of water-based paint formulations.

With regard to the coating of tannin-containing substrates, more particularly woods, the prior art is as follows:

U.S. Pat. No. 4,104,228 discloses the use of linear, partially deacylated poly(N—$C_2$-$C_4$-acyl)alkyleneimines, more particularly poly(N-propionyl)- or poly(N-butyroyl)ethyleneimine, having a weight-average molecular weight of more than 10 000 g/mol, for inhibiting discoloration of wood coatings. In that case the poly(N—$C_2$-$C_4$-acyl)alkyleneimines may be used either to prime the wood surfaces or else together with the polymeric binder directly in the paint formulation.

U.S. Pat. No. 4,075,394, for its part, discloses the use of polyalkyleneimines, more particularly polyethyleneimine, optionally with inert substitution, having a molecular weight 200 and ≤200 000 g/mol, for priming wood surfaces. Inert substituents in this context are understood to be those which behave inertly with respect to the barrier effect of the polyalkyleneimine itself, such as $C_1$ to $C_4$ alkyl groups, for example. Preferably, though, the polyalkyleneimines are unsubstituted.

U.S. Pat. No. 5,051,283 describes mixtures based on alkali metal salts of a $C_1$-$C_{18}$ carboxylic acid and on a water-soluble, low molecular mass monoamine or polyamine as active components in wood coating formulations. Preference is given to the use of mixtures of alkali metal salts based on a $C_1$-$C_6$ monocarboxylic or dicarboxylic acid and on low molecular mass polyamines having 3 to 6 nitrogen atoms, more particularly diethylenetriamine and triethylenetetramine.

DE-A 19908719 discloses protective coatings for woods for the purpose of preventing color runs and color strikethrough, and comprising as a key component an aqueous acrylate dispersion and a water-soluble, amine-containing polymer, more particularly polyethyleneimine.

It was an object of the present invention to provide an alternative and/or improved aqueous coating formulation for tannin-containing substrates, more particularly for wood.

The aqueous coating formulation defined at the outset has achieved this object.

Essential component of the aqueous coating formulation of the invention is a substituted $C_2$-$C_4$ polyalkyleneimine. This substituted $C_2$-$C_4$ polyalkyleneimine is obtainable by reacting a $C_2$-$C_4$ polyalkyleneimine having a weight-average molecular weight ≥500 and ≤10 000 g/mol with a carboxylic acid derivative of the general formula (I)

$$R\text{—}(C\text{=}O)X \qquad (I),$$

in which
R is a $C_1$ to $C_{30}$ alkyl group or a $C_3$ to $C_{30}$ alkenyl group and
X is a halogen, a hydroxyl group or a group R—(C=O)—O—,
where R has the definition indicated above,
with formation and removal of the byproduct HX.

The $C_2$-$C_4$ polyalkyleneimine which can be used for the reaction is selected from a group encompassing polyethyleneimine, polypropyleneimine, and polybutyleneimine, with particular preference being given to a polyethyleneimine.

Polyethyleneimines can be prepared either by ring-opening polymerization of acyl-substituted oxazolines, with subsequent hydrolysis, or by cationically initiated polymerization of ethyleneimine (aziridine), the former case producing a linear polyethyleneimine and the latter case producing its branched counterpart. Finding preferential use are polyethyleneimines which have been prepared by a cationically initiated polymerization of ethyleneimine and which, accordingly, have a branched structure with a fraction of primary and tertiary amino groups of about 30% each and with a fraction of secondary amino groups of about 40%.

The $C_2$-$C_4$ polyalkyleneimines which can be used for preparing the substituted $C_2$-$C_4$ polyalkyleneimine have a weight-average molecular weight ≥500 and ≤10 000 g/mol, advantageously ≥600 and ≤2000 g/mol, and with particular advantage ≥700 and ≤1500 g/mol. The determination of the weight-average molecular weight is familiar to the skilled person and takes place by the method of size exclusion chromatography, using a light scattering detector, as for example by means of an Agilent 1100 differential refractometer with Agilent 1100 VWD UV photometer and a Wyatt Dawn EOS light scattering detector. Polyethyleneimines in the corresponding molecular weight range are also available commercially, an example being Lupasol® G20 water-free, Lupasol® FG, Lupasol® G100 or Lutensol® FP 620 precursor from BASF SE.

In the carboxylic acid derivative (I), R is a $C_1$ to $C_{30}$, advantageously a $C_5$ to $C_{18}$ and with particular advantage a $C_6$ to $C_{12}$ alkyl group or is a $C_3$ to $C_{30}$, advantageously a $C_5$- to $C_{18}$ and with particular advantage a $C_6$ to $C_{12}$ alkenyl group.

By a $C_1$ to $C_{30}$ alkyl group are meant linear and branched alkyl groups having 1 to 30 C atoms, such as, for example, methyl, ethyl, propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, n-pentacosyl, n-hexacosyl, n-heptacosyl, n-octacosyl, n-nonacosyl, n-triacontasyl, and also their possible isomeric compounds, and by a $C_3$ to $C_{30}$ alkenyl group is meant linear and branched alkenyl groups having 3 to 30 C atoms, such as, for example, propenyl, n-butenyl, n-pentenyl, n-hexenyl, n-heptenyl, n-octenyl, n-nonenyl, n-decenyl, n-undecenyl, n-dodecenyl, n-tridecenyl, n-tetradecenyl, n-pentadecenyl, n-hexadecenyl, n-heptadecenyl, n-octadecenyl, n-nonadecenyl, n-eicosenyl, n-heneicosenyl, n-docosenyl, n-tricosenyl, n-tetracosenyl, n-pentacosenyl, n-hexacosenyl, n-heptacosenyl, n-octacosenyl, n-nonacosenyl, n-triacontasenyl, and also their possible isomeric compounds.

X is a halogen, such as fluorine, chlorine, bromine or iodine, more particularly chlorine, a hydroxyl group or a group R—(C=O)—O—, where R has the definition stated above. With particular preference X is a hydroxyl group.

The principle of the reaction of a $C_2$-$C_4$ polyalkyleneimine with a carboxylic acid derivative (I), with formation and removal of the byproduct HX, is one which is familiar to the skilled person and is known, for example, from DE-A 19801437, page 3 line 32 to page 5 line 53, and also examples 3 and 4, or from DE-A 3727704.

In accordance with the invention it is preferred, in the aqueous coating formulation, to use reaction products which have been prepared from a polyethyleneimine having a weight-average molecular weight 700 and 1500 g/mol and a carboxylic acid derivative (I) in which R is a $C_5$ to $C_{18}$ alkyl group or a $C_5$ to $C_{18}$ alkenyl group and X is a hydroxyl group. As carboxylic acid derivative (I) it is more particularly preferred to use lauric acid, stearic acid or oleic acid. It is self-evident here that, in accordance with the invention, reaction products of mixtures of $C_2$-$C_4$ polyalkyleneimines and mixtures of carboxylic acid derivatives (I), or mixtures of substituted $C_2$-$C_4$ polyalkyleneimines, are intended to be included as well.

In one particularly preferred embodiment the aqueous coating formulation uses reaction products in whose preparation the molar amount of the carboxylic acid derivative (I) employed is 1 to 30 mol %, more particularly 1 to 20 mol % and with particular advantage 3 to 10 mol % of the molar amount of $C_2$-$C_4$ alkyleneimine used in preparing the $C_2$-$C_4$ polyalkyleneimine employed.

In another embodiment, the aqueous coating formulation comprises not only the substituted $C_2$-$C_4$ polyalkyleneimine but also an emulsion polymer.

Emulsion polymers are familiar to the skilled person and are prepared, for example, in the form of an aqueous polymer dispersion by free-radically initiated aqueous emulsion polymerization of ethylenically unsaturated monomers. This method has been widely described before now and is therefore sufficiently well known to the skilled person [cf., e.g., Encyclopedia of Polymer Science and Engineering, vol. 8, pages 659 to 677, John Wiley & Sons, Inc., 1987; D. C. Blackley, Emulsion Polymerisation, pages 155 to 465, Applied Science Publishers, Ltd., Essex, 1975; D. C Blackley, Polymer Latices, 2nd Edition, vol. 1, pages 33 to 415, Chapman & Hall, 1997; H. Warson, The Applications of Synthetic Resin Emulsions, pages 49 to 244, Ernest Benn, Ltd., London, 1972; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969, and patent specification DE-A 40 03 422]. The free-radically initiated aqueous emulsion polymerization is typically accomplished by dispersing the ethylenically unsaturated monomers in the aqueous medium, generally using dispersing assistants, such as emulsifiers and/or protective colloids, and polymerizing them by means of at least one water-soluble free-radical polymerization initiator. Frequently, in the aqueous polymer dispersions obtained, the residual amounts of unreacted ethylenically unsaturated monomers are lowered by chemical and/or physical methods that are likewise known to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired level by dilution or concentration, or other customary additives, such as bactericidal, foam-modifying or viscosity-modifying additives, are added to the aqueous polymer dispersion.

In addition to these so-called primary aqueous polymer dispersions, the skilled person is also aware of so-called secondary aqueous polymer dispersions. By these are meant those aqueous polymer dispersions in whose preparation the polymer is produced outside of the aqueous dispersion medium, being located, for example, in solution in a suitable nonaqueous solvent. This solution is then transferred into the aqueous dispersion medium, and the solvent is separated off, generally by distillation, while dispersion takes place.

Advantageously in accordance with the invention it is possible to make use more particularly of those emulsion polymers in aqueous dispersion that comprise in copolymerized form 50% to 99.9% by weight of ester of acrylic and/or methacrylic acid with alkanols containing 1 to 12 C atoms and/or styrene, or 50% to 99.9% by weight of styrene and/or butadiene, or 50% to 99.9% by weight of vinyl chloride and/or vinylidene chloride, or 50% to 99.9% by weight of vinyl acetate, vinyl propionate, vinyl esters of Versatic acid, vinyl esters of long-chain fatty acids and/or ethylene.

With more particular advantage it is possible in accordance with the invention to use those emulsion polymers in aqueous dispersion that comprise in copolymerized form 0.1% to 5% by weight of at least one α,β-monoethylenically unsaturated monocarboxylic and/or dicarboxylic acid containing 3 to 6 C atoms, and/or amide thereof, and 50% to 99.9% by weight of at least one ester of acrylic and/or methacrylic acid with alkanols containing 1 to 12 C atoms and/or styrene, or 0.1% to 5% by weight of at least one α,β-monoethylenically unsaturated monocarboxylic and/or dicarboxylic acid containing 3 to 6 C atoms, and/or amide thereof, and 50% to 99.9% by weight of styrene and/or butadiene, or 0.1% to 5% by weight of at least one α,β-monoethylenically unsaturated monocarboxylic and/or dicarboxylic acid containing 3 to 6 C atoms, and/or amide thereof, and 50% to 99.9% by weight of vinyl chloride and/or vinylidene chloride, or 0.1% to 5% by weight of at least one α,β-monoethylenically unsaturated monocarboxylic and/or dicarboxylic acid containing 3 to 6 C atoms, and/or amide thereof, and 50% to 99.9% by weight of vinyl acetate, vinyl propionate, vinyl esters of Versatic acid, vinyl esters of long-chain fatty acids and/or ethylene.

In accordance with the invention it is preferred to use those emulsion polymers, present in aqueous dispersion, whose glass transition temperature is ≥−50 and ≤100° C., more particularly ≥−30 and ≤60° C., and advantageously ≥0 and ≤50° C. By the glass transition temperature (Tg) is meant the limiting value of the glass transition temperature to which it tends with increasing molecular weight, according to G. Kanig (Kolloid-Zeitschrift & Zeitschrift für Polymere, vol. 190, page 1, equation 1). The glass transition temperature is determined by the DSC method (Differential Scanning calorimetry, 20 K/min, midpoint measurement, DIN 53 765).

According to Fox (T. G. Fox, Bull. Am. Phys. Soc. 1956 [Ser. II], 1, page 123 and in accordance with Ullmann's Encyclopädie der technischen Chemie, vol. 19, page 18, 4th edition, Verlag Chemie, Weinheim, 1980) the glass transition temperature of copolymers with no more than low degrees of crosslinking is given in good approximation by:

$$1/Tg = x1/Tg1 + x2/Tg2 + \ldots xn/Tgn,$$

where x1, x2, xn are the mass fractions of the monomers 1, 2, . . . n and Tg1, Tg2, . . . Tgn are the glass transition temperatures of the polymers constructed in each case only from one of the monomers 1, 2, . . . n, in degrees Kelvin. The Tg values for the homopolymers of the majority of monomers are known and are listed for example in Ullmann's Encyclopedia of Industrial Chemistry, 5th edition, vol. A21, page 169, Verlag Chemie, Weinheim, 1992; other sources of homopolymer glass transition temperatures are constituted for example by J. Brandrup, E. H. Immergut, Polymer Handbook, 1st Ed., J. Wiley, New York, 1966; 2nd Ed. J. Wiley, New York, 1975 and 3rd Ed. J. Wiley, New York, 1989.

The average diameter of the emulsion polymers present in aqueous dispersion (polymer particles) is situated generally in the range from 10 to 1000 nm, often 50 to 500 nm or 80 to 300 nm. Furthermore, the solids contents of the aqueous dispersions of emulsion polymers that can be used in accordance with the invention are generally ≥10% and ≤70% by weight, advantageously ≥30% to ≤70% by weight, and with particular advantage ≥40% to ≤60% by weight.

In one preferred embodiment the aqueous coating formulations of the invention comprise ≥0.1 and ≤20 parts by weight, advantageously ≥0.15 and ≤15 parts by weight, and with particular advantage ≥0.2 and ≤7.5 parts by weight of substituted $C_2$-$C_4$ polyalkyleneimine per 100 parts by weight of emulsion polymer.

In accordance with the invention the aqueous coating formulations may also comprise further, customary components, familiar to the skilled person in terms of nature and amount, examples being binders, thickeners, pigment dispersants, other dispersants, emulsifiers, biocides, defoamers, film-forming assistants, organic solvents, pigments or fillers, etc.

The aqueous coating formulations of the invention are suitable advantageously for the coating of substrates, more particularly tannin-containing substrates, such as wood in particular.

The substrates are coated by coating the substrate first with an aqueous coating formulation of the invention and subsequently subjecting the aqueous coating to a drying step, more particularly in the temperature range ≥−10 and ≤50° C., advantageously ≥5 and ≤40° C., and with particular advantage ≥10 and ≤35° C.

It is essential that the aqueous coating formulation of the invention, which substantially comprises the substituted $C_2$-$C_4$ polyalkyleneimine, can be used for the pretreatment of tannin-containing substrates. This pretreatment takes place before the actual color coating. Furthermore, however, the aqueous coating may also be a paint formulation, which in addition to the substituted $C_2$-$C_4$ polyalkyleneimine also comprises the customary components that are usual and are familiar to the skilled person in terms of their nature and amount, such as, for example, binders (more particularly in the form of aqueous polymer dispersions), thickeners, pigment dispersants, other dispersants, emulsifiers, biocides, defoamers, film-forming assistants, organic solvents, pigments or fillers, etc.

In accordance with the invention the amount of coating formulation is selected such that the amount of substituted $C_2$-$C_4$ polyalkyleneimine is ≥0.001 and ≤100 g/m² substrate. Where the aqueous coating formulation is used for pretreatment, the amount of substituted $C_2$-$C_4$ polyalkyleneimine applied to the substrate is ≥0.01 and ≤50 g/m² and preferably ≥0.02 and ≤20 g/m². Where, on the other hand, the aqueous coating formulation is used in the form of a paint formulation, the amount of substituted $C_2$-$C_4$ polyalkyleneimine applied to the substrate is ≥0.005 and ≤20 g/m² and preferably ≥0.01 and ≤10 g/m².

Even during their application and drying (early tannin barrier effect) and also after drying with water exposure or under weathering conditions (late tannin barrier effect), the tannin-containing substrates coated with a coating formulation of the invention exhibit outstanding resistance with respect to color runs and color strikethrough.

The following nonlimiting examples are intended to illustrate the invention.

EXAMPLES

1. Preparation of the Substituted Polyethyleneimines a) Substituted Polyethyleneimine A In a nitrogen-flooded apparatus consisting of a flask equipped with stirrer and distillation bridge, 463 g of branched polyethyleneimine having a weight-average molecular weight of 1300 g/mol (Lupasol® G20 water-free; sales product from BASF SE) were heated to 140° C. with stirring (100 to 200 rpm). Over a time of approximately 30 minutes, a total of 107 g of lauric acid were added in portions. The reaction mixture was heated slowly with stirring under atmospheric pressure (1 atm absolute) to an internal temperature of 180 to 190° C., and the water produced (approximately 10 g) was distilled off over a time of approximately 8 hours. After cooling to 20 to 25° C. (room temperature), a determination was made of the acid number of the reaction product (substituted polyethyleneimine A), which was found to be 0.8 mg KOH per g.

The acid number was determined generally by potentiometric titration (standard DIN EN 12634). In this procedure, approximately 0.7 to 0.8 g of the substituted polyethyleneimine under test was dissolved in a solvent mixture of 20 ml of toluene and 50 ml of 2-propanol and titrated with a 0.1 molar tetra-n-butylammonium hydroxide solution (TBAH standard solution in toluene/methanol).

b) Substituted Polyethyleneimine B

The substituted polyethyleneimine B was prepared in the same way as for the preparation of the substituted polyethyleneimine A, with the difference that 500 g of branched polyethyleneimine having a weight-average molecular weight of 800 g/mol (Lutensol® FP 620 precursor; sales product from BASF SE) were used instead of 463 g of polyethyleneimine having a weight-average molecular weight of 1300 g/mol, and 166 g of stearic acid were used instead of 107 g of lauric acid. After cooling to room temperature, a determination was made of the acid number of the reaction product, which was found to be 0.8 mg KOH per g.

c) Substituted Polyethyleneimine C

The substituted polyethyleneimine C was prepared in the same way as for the preparation of the substituted polyethyleneimine B, with the difference that 501 g were used instead of 500 g of branched polyethyleneimine having a weight-average molecular weight of 800 g/mol, and 117 g of lauric acid were used instead of 166 g of stearic acid. After cooling to room temperature, a determination was made of the acid number of the reaction product, which was found to be 1 mg KOH per g.

d) Substituted Polyethyleneimine D

The substituted polyethyleneimine D was prepared in the same way as for the preparation of the substituted polyethyleneimine C, with the difference that 430 g were used instead of 501 g of branched polyethyleneimine having a weight-average molecular weight of 800 g/mol, and 138 g of oleic acid were used instead of 117 g of lauric acid. After cooling to room temperature, a determination was made of the acid number of the reaction product, which was found to be 0.5 mg KOH per g.

e) Substituted Polyethyleneimine E

The substituted polyethyleneimine E was prepared in the same way as for the preparation of the substituted polyethyleneimine C, with the difference that 497 g were used instead of 501 g of branched polyethyleneimine having a weight-average molecular weight of 800 g/mol, and 234 g were used instead of 117 g of lauric acid. After cooling to room temperature, a determination was made of the acid number of the reaction product, which was found to be 0.5 mg KOH per g.

f) Substituted Polyethyleneimine C1 (Comparative Polyimine 1)

The linear substituted polyethyleneimine C1 with a weight-average molecular weight of approximately 98 200 g/mol, in which approximately 10% of all the nitrogen atoms were substituted by a propionyl group, was prepared by partial hydrolysis as described in patent U.S. Pat. No. 4,104,228. For this purpose, 25 g of poly(2-ethyl-2-oxazoline) having a molecular weight of 200 000 g/mol were dissolved under nitrogen in 200 g of deionized water in a glass flask. Then 374 g of 37% strength by weight aqueous hydrochloric acid were added dropwise over a time of 15 minutes. The solution was heated to 100° C. and stirred at this temperature for 72 hours. The suspension was then concentrated to approximately 25 ml on a rotary evaporator at 70° C. and a pressure of 300 mbar (absolute) [AC1] and adjusted to a pH of 6.5 using 35 g of 50% strength by weight aqueous NaOH solution. The light brown solution obtained was concentrated further on a rotary evaporator, and the product which remained was taken up in a little water, filtered through a 118 µm Perlon filter and dialyzed in deionized water for 48 hours, using a dialysis tube from Spectra (Spectra/Por Molecular Porous Dialysis Membrane; MWCO: 3500 g/mol; Flat Width: 54 mm; diameter: 34 mm; length: 15 m). [AC2] The aqueous solution of the comparative polyimine was transferred from the dialysis tube into a glass flask and then the water was removed under reduced pressure (10 mbar absolute). 18.5 g of orange-colored substituted polyethyleneimine C1 were present, and its structure was characterized via $^1$H NMR spectroscopy.

g) Substituted polyethyleneimine C2 (comparative polyimine 2)

The substituted polyethyleneimine C2 was prepared in the same way as for the preparation of the substituted polyethyleneimine C, with the difference that 501 g of branched polyethyleneimine having a weight-average molecular weight of 25 000 g/mol (Lupasol® WF; sales product from BASF SE) were used instead of the polyethyleneimine having a weight-average molecular weight of 800 g/mol. After cooling to room temperature, a determination was made of the acid number of the reaction product, which was found to be 1.2 mg KOH per g.

2. Preparation of an Aqueous Polymer Dispersion

A reaction vessel equipped with stirrer, thermometer, reflux condenser, and feed vessels was charged at room temperature under a nitrogen atmosphere with a mixture of 2900 g of deionized water, 24 g of a 15% strength by weight aqueous solution of sodium lauryl sulfate, 150 g of a 20% strength by weight aqueous solution of a $C_{16}C_{18}$ fatty alcohol polyethoxylate, 37.2 g of a 6% strength by weight aqueous solution of sodium bicarbonate, and 314 g of feed 1.

Feed 1 was composed of 1945 g of deionized water, 140 g of a 15% strength by weight aqueous solution of sodium lauryl sulfate, 113 g of a 32% strength by weight aqueous solution of a $C_{12}C_{14}$ fatty alcohol polyethoxysulfate sodium salt (Disponil® FES 77; sales product of Cognis GmbH), 150 g of a 20% strength by weight aqueous solution of a $C_{16}C_{18}$ fatty alcohol polyethoxylate, 67 g of acrylic acid, 170 g of a 50% strength by weight aqueous solution of acrylamide, 3060 g of n-butyl acrylate, and 2370 g of methyl methacrylate in homogenous emulsion.

The initial charge was heated to 90° C. with stirring. Subsequently, with this temperature maintained, 32 g of a 7% strength by weight aqueous solution of sodium peroxodisulfate were added and the resulting mixture was stirred for 5 minutes. Thereafter, beginning simultaneously, the remainder of feed 1, and 185 g of a 7% strength by weight aqueous solution of sodium peroxodisulfate, were metered in via separate feed lines continuously over the course of 3 hours at constant volume flow rates.

Polymerization was continued for 15 minutes after the end of the feeds, and then 40 g of a 25% strength by weight aqueous ammonia solution were added to the aqueous polymer dispersion obtained. After cooling to 85° C., the aqueous polymer dispersion obtained was supplied, beginning simultaneously, with 76 g of a 10% by weight aqueous solution of tert-butyl hydroperoxide and 101 g of a 13.1% strength by weight aqueous solution of acetone bisulfite (1:1 adduct of acetone and sodium bisulfite) over the course of 1 hour, continuously, with constant volume flow rates. After the end of the additions, 80 g of deionized water and 36 g of Acticid® MBS (sales product of Thor Chemie GmbH) were added to the aqueous polymer dispersion. Subsequently the aqueous polymer dispersion was cooled to room temperature and filtered through a 125 µm filter.

The aqueous polymer dispersion obtained had a solids content of 50.2% by weight and a glass transition temperature of 17° C. The average particle diameter was 115 nm.

The solids content was determined by drying a defined amount of the aqueous polymer dispersion (approximately 2 g) to constant weight in an aluminum crucible having an internal diameter of approximately 5 cm at 120° C. in a drying cabinet (approximately 2 hours). Two separate measurements were carried out. The figure reported in the example represents the average of the two results.

The average particle diameter of the polymer particles was determined by dynamic light scattering on an aqueous polymer dispersion diluted with deionized water to 0.005% to 0.01% by weight, at 23° C., using a High Performance Particle Sizer (HPPS) from Malvern Instruments, England. The figure reported is the average diameter of the cumulant evaluation (cumulant $z_{average}$) of the measured autocorrelation function (ISO standard 13321).

The glass transition temperature was determined by the DSC method (Differential Scanning calorimetry, 20K/min, midpoint measurement, DIN 53765) using a DSC 822 instrument (TA 8000 series) from Mettler-Toledo.

3. Preparation of the Modified Aqueous Polymer Dispersions

In a first step, 50% strength by weight aqueous solutions were prepared of the substituted polyethyleneimines A to C2 at room temperature.

Thereafter a portion of each of the aqueous polymer dispersions was admixed at room temperature, with stirring, with an aqueous solution of one of the substituted polyethyleneimines A to C2. The amounts of the aqueous solutions of the substituted polyethyleneimines A to C2 were calculated so as to give the values reported in table 1 below. Reported is the amount of substituted polyethyleneimine in parts by weight, based on 100 parts by weight of solids (solids content) of the aqueous polymer dispersion used (solids/solids). The corresponding designation of the modified aqueous polymer dispersion obtained is likewise indicated in table 1.

TABLE 1

Preparation of the aqueous polymer dispersions modified with the substituted polyethyleneimines

| Substituted polyethyl-eneimine | Amount [per 100 parts by weight of solids of the aqueous polymer dispersion] | Designation of the modified aqueous polymer dispersion |
|---|---|---|
| A | 0.25 | Dispersion A1 |
| A | 0.5 | Dispersion A2 |
| A | 1.0 | Dispersion A3 |
| A | 2.0 | Dispersion A4 |
| A | 3.0 | Dispersion A5 |
| B | 3.0 | Dispersion B |
| C | 3.0 | Dispersion C |
| D | 3.0 | Dispersion D |
| E | 3.0 | Dispersion E |
| — | — | Dispersion C0 |
| C1 | 3.0 | Dispersion C1*) |
| C2 | 3.0 | Dispersion C2 |

*)When the substituted polyethyleneimine C1 was incorporated there was flocculation/coagulation, so it was not possible to carry out further processing of dispersion C1

4. Preparation of a Paint Formulation

The corresponding paint formulations were prepared by using a toothed disc stirrer to carry out homogeneous mixing, at room temperature, of the components listed in table 2 below, in the stated amount and in the stated order, to form color pastes.

TABLE 2

Components of the color pastes

| Ingredient | Parts by weight [g] |
|---|---|
| Deionized water | 102.5 |
| Thickener[1] | 8.2 |
| Pigment dispersant[2] | 2.0 |
| Dispersant[3] | 4.1 |
| Biocide[4] | 2.0 |
| Defoamer[5] | 5.1 |
| Film-forming assistant[6] | 20.5 |
| Pigment[7] | 204.9 |
| Filler[8] | 82.0 |
| Filler[9] | 30.7 |
| Solvent[10] | 15.4 |
| Thickener[11] | 4.6 |

[1]Coapur ® XS 73 Omya GmbH, Germany
[2]Pigmentverteiler ® MD 20 BASF SE, Germany
[3]25% strength by weight aqueous solution of sodium polyphosphate Sigma Aldrich Chemie GmbH, Germany
[4]Parmetol ® A 26 Schülke & Mayr GmbH, Germany
[5]Byk ® 024 Byk-Chemie GmbH, Germany
[6]Lusolvan ® PP BASF SE, Germany
[7]Titanium dioxide; Kronos ® 2056 Kronos Titan GmbH, Germany
[8]Calcium carbonate; Omyacarb ® 5 GU Omya GmbH, Germany
[9]Talc; Finntalc ® M 30 SL Mondo Minerals, the Netherlands
[10]Butyl diglycol BASF SE, Germany
[11]Collacral ® LR 8990 BASF SE, Germany The color pastes freshly prepared in accordance with the procedure described above were filtered through a 125 μm filter with application of a vacuum in order to remove air bubbles and larger pigment agglomerates. Following this, 438.5 g of each of dispersions A1 to C2 and 79.4 g of deionized water were mixed homogeneously into the color pastes. The paint formulations obtained accordingly were then stored at rest to room temperature for one day.

In accordance with the dispersions A1 to C2 employed, the paint formulations obtained are referred to as formulation A1 to C2.

5. Performance Investigations

The performance investigations were carried out using untreated merbau, cedar and oak. Planks with dimensions of 1500×140×10 mm of the various woods were used, and were freed from adhering dust using a dry cotton cloth. In order to minimize deviations and to ensure comparability, the test series were each carried out on one plank. The procedure involved first coating areas of 130×40 mm uniformly with 0.46 g of one of the formulations A1 to C2, and then drying it in a controlled-climate chamber at 23° C. and 50% relative humidity for 2 hours (coat 1). Subsequently, 0.32 g of the respective formulation was applied uniformly to each of these coatings over an area of 90×40 mm and dried in the same way as for the first coat (coat 2). After that, 0.18 g of the respective formulation was applied uniformly to this second coat over an area of 50×40 mm (coat 3), after which the planks thus coated were stored for 24 hours in a controlled-climate chamber at 23° C. and 50% relative humidity. Since coating was commenced in each case flush to one side edge, the respective paint films had a 40×40 mm area coated only once (coat 1), a 40×40 mm area coated twice (coat 1 plus coat 2), and a 50×40 mm area coated three times (coat 1 plus coat 2 plus coat 3). The paint films obtained on the respective wooden planks are identified, depending on the formulation used to coat them, as paint films A1 to C2. As a reference, the corresponding paint formulations were applied to grease-free glass plates and dried.

The discoloration was measured by two different methods. Method 1 was used to determine the degree of discoloration resulting from the application of each of the aqueous paint formulations, and its drying (early tannin barrier). With method 2, the degree of discoloration was determined that results from the influence of water on each of the dried paint films (late tannin barrier).

Method 1

Using a photospectrometer (Minolta CM-508i Spectrometer), at least two points on coat 3 of the respective paint films on the wooden planks and glass plates were used for measurement of the so-called L, a and b values, and subsequently the respective average was formed. After that, the differences between the averaged L, a and b values of the respective paint films on the wooden planks and glass plates were ascertained ($\Delta L$, $\Delta a$ and $\Delta b$). One measure of the respective deviation in color is the $\Delta E$ value, which was determined as follows:

$$\Delta E = \sqrt{(\Delta L)^2 + (\Delta a)^2 + (\Delta b)^2}$$

The smaller the $\Delta E$ value, the smaller the deviation in color (and hence the less the "bleeding" of the wood in question). This means, that the lower the $\Delta E$ value of each of the paint films, the less colored substances have been leached from the wood in question in the course of the application and drying of the respective paint formulation. The results obtained from the various measurement series are listed in table 3.

Note: The so-called CIE-Lab color space is formed from the lightness axis L, the red/green axis a and the yellow/blue axis b. Corresponding color deviations are indicated by the $\Delta E$ value (as defined above).

Method 2

One drop of deionized water was applied to coat 3 of each of the paint films on the wooden planks, and the paint films thus treated were dried in a controlled-climate chamber at 23° C. and 50% relative humidity for 12 hours. After that, the locations with the dried water drops were evaluated in accordance with the following scale of ratings:

| Rating | Evaluation |
| --- | --- |
| 0 | the full ring of water is clearly apparent and dark brown in color |
| 1 | the full ring of water is clearly apparent and light brown in color |
| 2 | the outer ring of water can be seen |
| 3 | parts of the outer ring of water can be seen |
| 4 | the water ring is still perceptible, but not colored |
| 5 | it is impossible to tell where the drop of water was |

At least 2 measurements were carried out on each paint film. The values reported in table 3 represent the averages of these assessments.

TABLE 3

Results of the performance investigations

| Measurement series | Paint film | ΔE | Rating |
| --- | --- | --- | --- |
| 1 (merbau) | A1 | 0.811 | 4 |
| | A2 | 0.899 | 5 |
| | C0 | 1.219 | 3 |
| 2 (merbau) | A3 | 0.187 | 5 |
| | A4 | 0.180 | 5 |
| | A5 | 0.183 | 5 |
| | C0 | 0.585 | 3 |
| | C2 | 0.397 | 3 |
| 3 (merbau) | B | 0.500 | 4 |
| | C | 0.483 | 5 |
| | D | 0.528 | 5 |
| | E | 0.426 | 4 |
| | C0 | 0.699 | 3 |
| | C2 | 0.607 | 3 |
| 4 (cedar) | A1 | 0.237 | 3 |
| | A2 | 0.205 | 5 |
| | A3 | 0.188 | 4 |
| | A4 | 0.179 | 5 |
| | A5 | 0.150 | 5 |
| | C0 | 0.429 | 2 |
| 5 (cedar) | B | 0.655 | 4 |
| | C | 0.611 | 5 |
| | D | 0.623 | 4 |
| | E | 0.604 | 4 |
| | C0 | 0.811 | 2 |
| | C2 | 0.789 | 3 |
| 6 (oak) | B | 0.275 | 5 |
| | C | 0.211 | 4 |
| | D | 0.223 | 5 |
| | E | 0.264 | 5 |
| | C0 | 0.469 | 2 |
| | C2 | 0.417 | 3 |

From the results it is clearly evident that the paint films A to E produced with the dispersions A to E of the invention produced significantly lower ΔE values on the same wooden planks than the paint films C0 and C2 produced using the comparative dispersions C0 and C2. In addition, the rating of the late tannin barrier effect (method 2) when using the dispersions A to E of the invention (paint films A to E) is consistently better in comparison to the comparative dispersions C0 and C2 (paint films C0 and C2).

The invention claimed is:

1. An aqueous coating formulation comprising a substituted, branched polyethyleneimine which is obtained by a process comprising reacting a branched polyethyleneimine having a weight-average molecular weight of from 500 to 10,000 g/mol with a carboxylic acid derivative of formula (I)

$$R\text{---}(C\text{=}O)X \qquad (I),$$

wherein
R is a $C_5$ to $C_{18}$ alkyl group or a $C_5$ to $C_{18}$ alkenyl group,
X is a halogen, a hydroxyl group, or a group R—(C=O)—O—,
a molar amount of the carboxylic acid derivative in the reacting is from 3 to 10 mol % of a molar amount of ethyleneimine employed in preparing the branched polyethyleneimine,
the reacting comprises formation and removal of a byproduct HX, and
the formulation is configured to coat a substrate that comprises tannin.

2. The aqueous coating formulation according to claim 1, wherein the branched polyethyleneimine has a weight-average molecular weight of from 500 to 2000 g/mol.

3. The aqueous coating formulation according to claim 1, wherein X is a hydroxyl group.

4. The aqueous coating formulation according to claim 1, further comprising an emulsion polymer.

5. The aqueous coating formulation according to claim 4, wherein the emulsion polymer has a glass transition temperature of from −50 to 100° C.

6. The aqueous coating formulation according to claim 4, comprising from 0.1 to 20 parts by weight of the substituted branched polyethyleneimine per 100 parts by weight of the emulsion polymer.

7. A method of coating a substrate, comprising contacting the coating formulation according to claim 1 with the substrate, wherein the substrate comprises a tannin.

8. A method of coating a substrate, comprising first contacting the substrate with the aqueous coating formulation according to claim 1, and subsequently drying the aqueous coating formulation,
wherein the substrate comprises a tannin.

9. The method according to claim 8, wherein an amount of the aqueous coating formulation is such that an amount of the substituted branched polyethyleneimine is from 0.001 to 100 g/m² of the substrate.

10. A substrate obtained by the method according to claim 8.

11. A coated substrate, comprising:
a substrate that comprises tannin, and
a dried coating, obtained by a process comprising drying the formulation of claim 1 on the substrate.

12. The coated substrate of claim 11, wherein the branched polyethyleneimine has a weight-average molecular weight of from 500 to 2000 g/mol.

13. The coated substrate of claim 11, wherein the substrate is wood.

14. The coated substrate of claim 11, wherein the formulation further comprises an emulsion polymer.

15. The coated substrate of claim 11, wherein the emulsion polymer has a glass transition temperature of from −50 to 100° C.

16. The coated substrate of claim 14, wherein the formulation comprises from 0.1 to 20 parts by weight of the substituted branched polyethyleneimine per 100 parts by weight of the emulsion polymer.

17. The aqueous coating formulation of claim 1, wherein the branched polyethyleneimine has a weight-average molecular weight of from 600 to 2,000 g/mol.

18. The coated substrate of claim 11, wherein the branched polyethyleneimine has a weight-average molecular weight of from 600 to 2,000 g/mol.

\* \* \* \* \*